US008929588B2

(12) United States Patent
Subbaraya et al.

(10) Patent No.: US 8,929,588 B2
(45) Date of Patent: Jan. 6, 2015

(54) OBJECT TRACKING

(75) Inventors: Yadhunandan Ullam Subbaraya, Tirupati (IN); Mahesh Kumar Gellaboina, Kurnool (IN); Ben A Miller, Minneapolis, MN (US); MaryRosaline Mariappan, Madurai (IN); Dinesh Ramegowda, Mysore (IN); Gurumurthy Swaminathan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 155 days.

(21) Appl. No.: 13/189,076

(22) Filed: Jul. 22, 2011

(65) Prior Publication Data
US 2013/0022234 A1 Jan. 24, 2013

(51) Int. Cl.
*G06K 9/00* (2006.01)
*G06T 7/20* (2006.01)

(52) U.S. Cl.
CPC ......... G06T 7/20 (2013.01); *G06T 2207/30241* (2013.01)
USPC ........... 382/103; 345/589; 348/157; 348/169; 382/154; 382/243

(58) Field of Classification Search
None
See application file for complete search history.

(56) References Cited

U.S. PATENT DOCUMENTS

| 5,969,755 | A | 10/1999 | Courtney | |
|---|---|---|---|---|
| 6,198,833 | B1 * | 3/2001 | Rangan et al. | 382/103 |
| 6,553,150 | B1 * | 4/2003 | Wee et al. | 382/243 |
| 6,774,908 | B2 * | 8/2004 | Bates et al. | 345/589 |
| 6,983,205 | B2 | 1/2006 | Chen et al. | |
| 7,016,781 | B1 | 3/2006 | Wolfson | |
| 7,299,126 | B2 | 11/2007 | Gedik et al. | |
| 7,391,907 | B1 | 6/2008 | Venetianer et al. | |
| 7,403,664 | B2 | 7/2008 | Porikli et al. | |
| 7,801,328 | B2 | 9/2010 | Au et al. | |
| 8,134,596 | B2 * | 3/2012 | Lei et al. | 348/169 |
| 2003/0126622 | A1 | 7/2003 | Cohen et al. | |
| 2003/0179294 | A1 * | 9/2003 | Martins | 348/157 |
| 2004/0086152 | A1 | 5/2004 | Kakarala et al. | |
| 2004/0158398 | A1 | 8/2004 | Chen et al. | |
| 2005/0104961 | A1 | 5/2005 | Han et al. | |
| 2005/0146605 | A1 | 7/2005 | Lipton et al. | |
| 2005/0271251 | A1 * | 12/2005 | Russell et al. | 382/103 |
| 2008/0159590 | A1 | 7/2008 | Yi et al. | |
| 2008/0166015 | A1 | 7/2008 | Haering et al. | |
| 2008/0225155 | A1 * | 9/2008 | Ebato et al. | 348/333.05 |
| 2009/0060321 | A1 * | 3/2009 | Gillard et al. | 382/154 |
| 2009/0158367 | A1 | 6/2009 | Myers et al. | |
| 2010/0026802 | A1 | 2/2010 | Titus et al. | |

* cited by examiner

*Primary Examiner* — Tsung-Yin Tsai
(74) *Attorney, Agent, or Firm* — Brooks, Cameron & Huebsch, PLLC

(57) ABSTRACT

Methods, devices, and systems for object tracking are described herein. One or more method embodiments include receiving an initial set of track points associated with a trajectory of an object, compressing the initial set of track points into a plurality of track segments, each track segment having a start track point and an end track point, and storing the plurality of track segments to represent the trajectory of the object.

12 Claims, 4 Drawing Sheets

US 8,929,588 B2

OBJECT TRACKING

TECHNICAL FIELD

The present disclosure relates to methods, devices, and systems for object tracking.

BACKGROUND

Many businesses and other facilities, such as banks, stores, airports, etc., make use of security systems. Among such systems are video-based systems, in which a sensing device, like a video camera, obtains and records images within its sensory field. For example, a video camera will provide a video record of whatever is within the field-of-view of its lens. A trajectory of an object within the field-of-view includes an exhaustive amount of data. For example, each track point of an object contains full information from location to size to parameters like velocity, etc of the object in that frame. The amount of data stored for the trajectory of an object makes forensic analysis time and resource consuming.

Previous approaches for forensic analysis of event detection process the entire video data to compute object trajectories. The data in the video data is analyzed for suspicious activity over a period of days. Analyzing all of the data of the video can be time consuming and can lead to delays. The previous approaches for compressing the data use a cumulative error computation method, where you need a lot of computations and the entire track segment needs to be present at the time of the compression.

DETAILED DESCRIPTION

Figure 1:
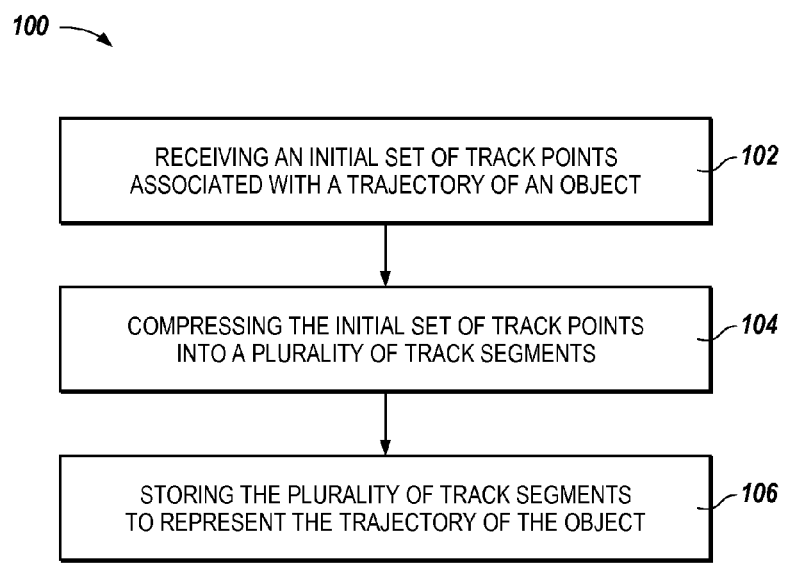
FIG. 1 is a flow chart illustrating a method for tracking an object in accordance with one or more embodiments of the present disclosure.

Methods, devices, and systems for object tracking are described herein. One or more method embodiments include receiving an initial set of track points associated with a trajectory of an object, compressing the initial set of track points into a plurality of track segments, each track segment having a start track point and an end track point, and storing the plurality of track segments to represent the trajectory of the object.

One or more embodiments of the present disclosure can provide a concise representation (e.g., compressed data) of an object trajectory. The concise representation (e.g., a plurality of track segments) can reduce the number of track points of the object to be stored but also can keep the error caused because of the concise representation within predetermined limits. These limits can, for example, be defined with respect to spatial and velocity characteristics.

In one or more embodiments, the compressed data along with relevant characteristics of the object trajectory can be indexed and stored in a database. The information indexed and stored along with other relevant information of the trajectory of the object can, for example, be used to reduce the retrieval time for a query and, can for example, reduce the data with an algorithm needs to process. Reducing the data with which the algorithm needs to process can also reduce the time it takes for an algorithm to perform relevant on an object trajectory.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present invention, and should not be taken in a limiting sense.

As used herein, "a" or "a number of" something can refer to one or more such things. For example, "a trajectory" can refer to one or more trajectories of an object.

FIG. 1 is a flow chart 100 illustrating a method for tracking an object in accordance with one or more embodiments of the present disclosure. The method can be performed by a computing device (e.g., computing device 442 described in connection with FIG. 4), as will be further described herein.

The object to be identified can be, for example, an object on a within the field-of-view of acquisition technology, (e.g., a video recorder or a surveillance camera). The object can be an object that is moving or capable of providing a trajectory. For instance, the object can be a person, a vehicle, a bicycle, or an animal, among other types of objects. However, embodiments of the present disclosure are not limited to a particular type of object.

At block 102, an initial set of track points associated with a trajectory of an object is received. Object movement is continuous in nature, which can be represented by the acquisition technology in discrete representations. For example, an object trajectory can be a series of time-stamped spatial positions in a frame of the acquisition technology. Surveillance situations generate extensive spatio-temporal information about the object through the object's trajectory. For example, the information in an object trajectory can include metadata such as, but not limited to, spatial location, speed, size, time, among other information, as will be further described herein.

Additionally, the initial set of track points associated with the trajectory of the object can be assigned a track identification number. The track identification number along with the other data of the object trajectory can be stored.

At block 104, the initial set of track points is compressed into a plurality of track segments. Each track segment can have a start track point and an end track point. The compression of the initial set of track points can be performed once the initial set of track points is complete. Additionally, the compression of the initial set of track points can be performed in real-time as a new track point of the object trajectory is received. In some embodiments, as the track segments are being determined (e.g., computed), an angle of each of the track segments representing the trajectory of the object with respect to a horizontal axis of a boundary can also be determined.

At block 106, the plurality of track segments representing the trajectory of the object is stored. Since the trajectory of the object is stored in a line-segment format rather than point wise format along with the metadata to represent the trajectory of the object. Storing the trajectory of the object in the line-segment format with the metadata, reduces the computation times for event detection, discussed herein. In some embodiments, the determined angles can be stored along with the track segments.

Figure 2:
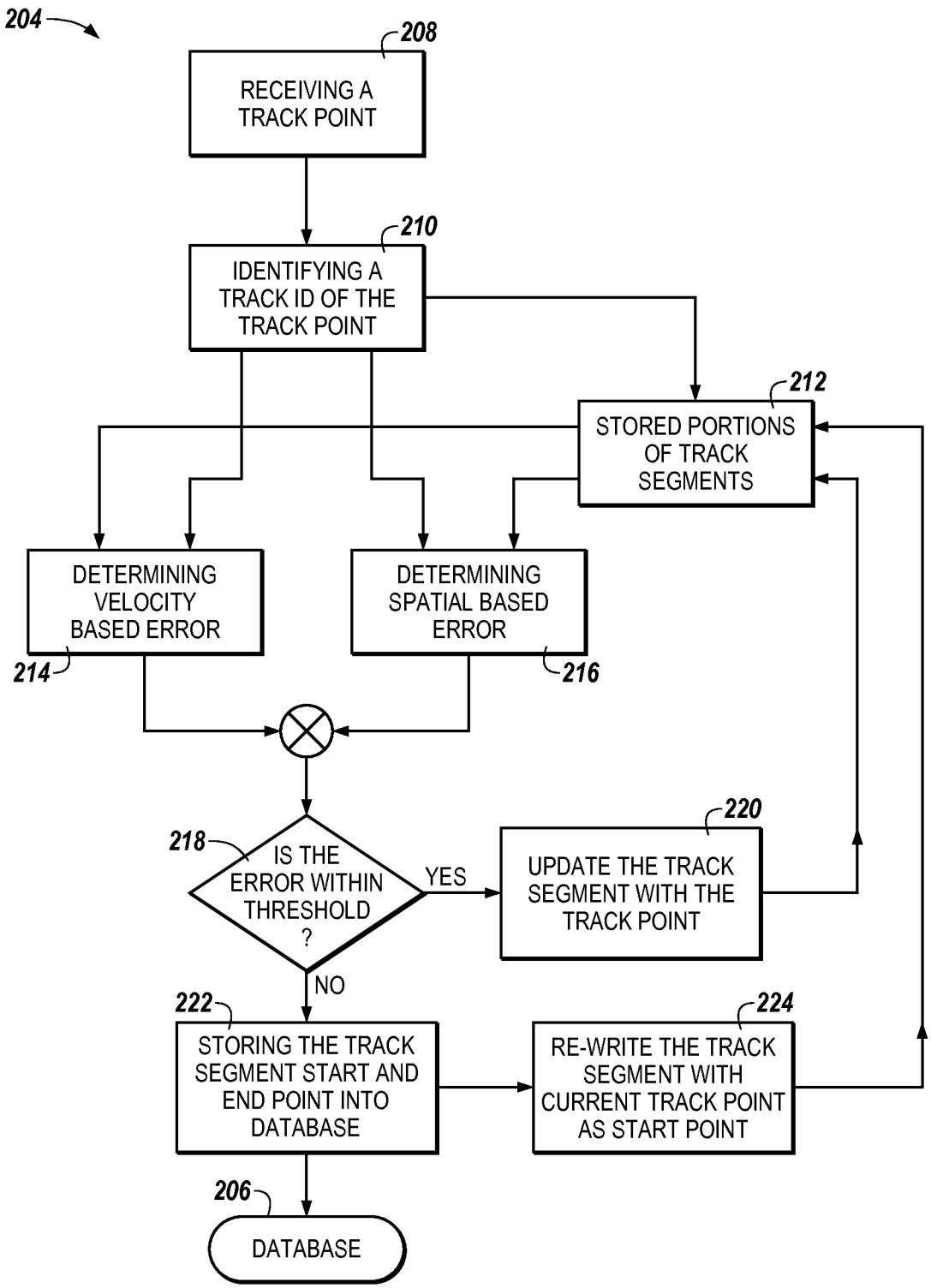
FIG. 2 is a flow chart illustrating a method for compressing an initial set of track points in accordance with one or more embodiments of the present disclosure.

FIG. 2 illustrates a method 204 for compressing the initial set of track points (e.g., block 104 described in connection with FIG. 1). At block 208, a track point of the initial set of track points is received. Again, the compression can be performed in real-time or once the initial set of track points is complete. Compressing the data includes implementing two different versions of track compression algorithms. As discussed herein, the track compression algorithms can be classified as "Opening Window" algorithms. Opening Window algorithms can be defined as starting from one end of the data series (e.g., the first point in the initial set of track points), and a data segment or subseries (e.g., one of the plurality of track segments) is grown until some halting condition is reached.

At block 210, the track identification (ID) number is identified for the received track point. As discussed herein, each set of track points is assigned a track ID. The compression of data can start, as discussed herein, from one end of the data series, and in this instance the first point in the initial track points. If the track point received is a start track point, the start track point is stored in the portions of track segments at block 212. If the received track point is not the start track point, the method continues to block 214 and 216 where the velocity based error and the spatial error are determined, respectively.

In one embodiment, the velocity and spatial based error can be determined by using a spatio-temporal track compression algorithm. For example, the velocity and spatial based error can determine to discard track points based on the position, time stamp, and approximate position of the data point on a new trajectory. That is, a track segment has a start track point and an end track point, where a straight line connect the two. A track point not previously positioned on the straight line can be determined to be discarded. For example, the original track point $P_i$ and it's approximation $P_i'$ on the new trajectory $P_s$ (e.g., start point)—$P_e$ (e.g., end track point) of the new trajectory (e.g., the straight line) are indicated. The coordinates for the $P_i'$ are calculated from the simple ratio of two time intervals $\Delta e$ and $\Delta i$ indicating, respectively, travel time of the object from $P_s$ to $P_e$ along the trajectory and $P_s$-$P_i$ along the approximated trajectory. These travel times are computed from the original data timestamp differences. So from the data the approximate position $P_i'$-$(x_i', y_i')$ can be computed as follows:

$$\Delta e = t_e - t_s$$

$$\Delta i = t_i - t_s$$

-continued $$x_i' = x_s + \frac{\Delta i}{\Delta e}(x_e - x_s)$$

$$y_i' = y_s + \frac{\Delta i}{\Delta e}(y_e - y_s)$$

Once the approximate position $P_i'$ is computed, the next step is to calculate the distance between the approximate position and the original position $P_i$ and use that distance as a discarding criterion against the user defined tolerance threshold called position-difference threshold (e.g., spatial error).

Further improvements can be obtained by exploiting other spatiotemporal information like speed. This can be achieved by analyzing the derived speeds at sub-series level (e.g., track points) of the trajectory ($\Delta v_i$-$\Delta v_i$). A large difference in the travel speeds of two subsequent track points is another criterion that can be applied to retain or discard the track points. That is, there is a speed-difference threshold (e.g., velocity based error). By integrating the concepts of the spatial error and the velocity based error the object trajectory can be compressed with a minimum amount of error.

Additionally, the velocity and spatial based error can be determined by using an eigen value based track compression algorithm. The eigen proposed method is based on a merging approach. For instance, the eigen method is starting point independent and can be computationally more efficient. The approximation or compression procedure begins with a starting point, which is the starting point of a track segment of the plurality of track segments representing the trajectory of the object (e.g., the piecewise sub-segment in the trajectory of the object).

The starting point merges with the next consecutive track point in sequence until the least of the two eigen values of the covariance matrix of the set of all merged track points become larger than a predefined user threshold value. The covariance matrix (eigen values) are computed on the spatial (x,y);(row, col) position of the track point. That is, the covariance matrix can be determined from the available track point spatial positions, and the eigen values for the covariance matrix can then be determined.

The least of the eigen values can be used as a measure to determine a variation (e.g., shift) from a straight line trajectory (e.g., path), and the least of the eigen values can be compared with a spatial variation threshold to determine whether to stop or continue the compression. For example, if the least eigen value crosses the threshold then the point lying prior to the data point at which the merging process halts will be considered as the end point of the track segment of the plurality of track segments (e.g., the piecewise sub-segment). The merging process is repeated from the halting point by treating it as the start of the next track segment (e.g., sub-segment). The algorithm stops upon the completion of the traversal of the entire track points of the trajectory of the object.

The eigen value analysis for track compression merges as many points as possible as long as they are collinear. The least eigen value of any straight line segment is zero regardless of its length and orientation. Hence, the concept of eigen value can be used to merge the track points which are collinear.

If the position information (x,y) of the track points is given to an Eigen decomposition module it will return two eigen vectors and their corresponding eigen values ($\lambda_L$, $\lambda_S$). The eigen vector corresponding to the large eigen value '$\lambda_L$' will be in the direction of motion of the object and eigen value '$\lambda_S$' will be the variance of the data points along this direction. The first eigen vector and it's eigen value '$\lambda_L$' are of not much significance; however, the least eigen value '$\lambda_S$' is of great significance. The second eigen vector is perpendicular to the first eigen vector (which is in the direction of motion), so it will be in the direction of variation of the track points position with respect to object motion. The least eigen value '$\lambda_S$' corresponding to it will give the variation of the track points along the second eigen vector, which can be interpreted as the variation of the positions of the data points with respect to the piecewise linear approximation of a sub-segment of the plurality of track segments. This least eigen value '$\lambda_S$' will be used as criterion to compare against the user defined threshold. Additionally, the eigen method of compression can be combined with the speed-difference threshold as explained herein.

The reader should note that any object can move in a straight line at varying speeds. In some instances, the compression of the trajectory information will lose data on the changes in the speed. Taking that into consideration, velocity based error can be utilized. The velocity based error can be computed based on a velocity difference between consecutive track points.

Once the velocity based error and the spatial based error are determined, block 218 can be determined. At block 218, it is determined if the error is within the defined thresholds. At block 220, if the error is within the threshold, the track segment is updated with the track point. As discussed herein, if the track segment is updated with the track point, portions of the track segments stored at block 212 are updated and a subsequent track point is analyzed.

At block 222, if the velocity error and the spatial error are not within (e.g., above) the threshold, the track segment without the track point is stored, at block 206 (e.g., corresponding to the block 106 in FIG. 1), in the database as a track segment of the plurality of track segments of the trajectory of the object. Additionally, at block 224, the portion of the track segment stored at block 212 is re-written with the track point, where the track point is a start track point of a subsequent track segment of the plurality of track segments of the trajectory of the object.

Figure 3:
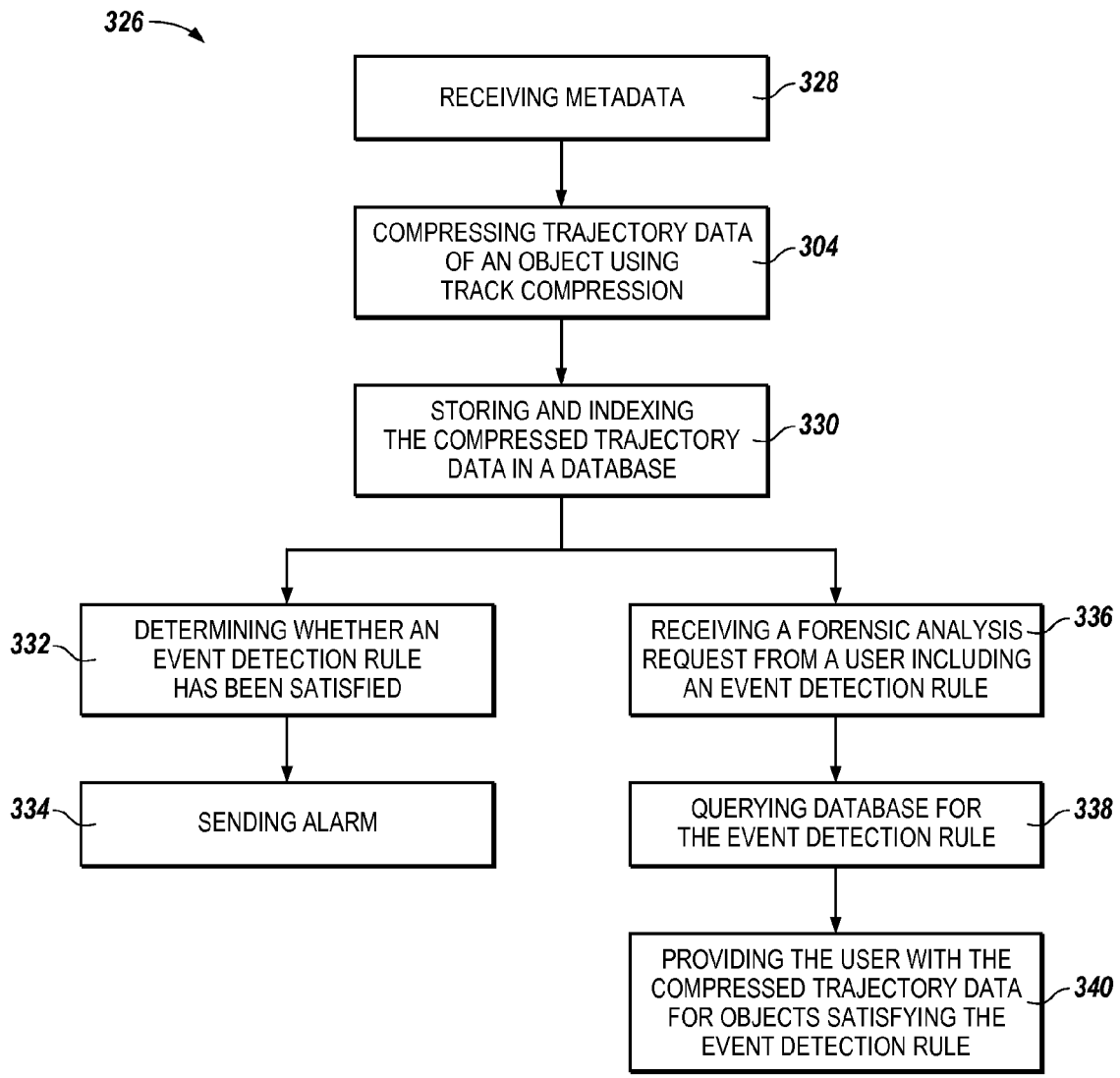
FIG. 3 is a flow chart illustrating a method for tracking an object in accordance with one or more embodiments of the present disclosure.

FIG. 3 is a flow chart 326 illustrating a method for tracking an object. At block 328, metadata for a trajectory of an object (e.g., the plurality of initial track points) is received. As discussed herein, the metadata can include positions, boundary of a restricted zone, velocity, and direction at each data point in the trajectory of the object. For instance, the metadata can include object type (e.g., class), object track identification, object spatial position (e.g., the foot and/or center position of the object), object bounding box, object size, current time stamp of the object, the last time the object was seen, whether the object is moving, whether the object is occluded, whether a person is moving slowly, a car slowly moving, a person walking, a person falling down, motion direction along an x,y axis, and/or average speed, current speed, relative speed, and/or previous speed in an x,y direction, among other types of metadata. At block 304, the track points of the trajectory of the object is compressed using the track compression, as described herein (e.g., block 104 of FIG. 1, and method 204 of FIG. 2).

At block 330, the compressed track data (e.g., trajectory of the object) is stored and indexed in a database. The compressed track data includes the trajectory of the object stored as line segments (e.g., track segments) and an angle of each track segment making up the trajectory of the object. Determining the angle of each track segment can include using the starting point of each track segment as an origin of an axis for calculation of the angle along the track segment from the start point to the end point. The data can be indexed according to relevant characteristics of the compressed track data (e.g., metadata).

In some embodiments, during the track compression, additional parameters such as, for instance, where the object has loitered, which portion of the image has loitered, whether and/or where a sudden change in velocity and/or direction occurred, whether the object has made a u-turn and/or a 180 degree change in direction. These findings can be converted into event parameters, and indexed into the database along with the compressed track data.

At block 332, it is determined whether an event detection rule has been satisfied by a portion of the plurality of track segments associated with the object. For example, event detection rule can include various restricted zones or restricted times in a zone. For example, event detection rules can be for an object loitering (e.g., in a restricted zone such as, for instance, a dock), a sterile event (e.g., an object entering a sterile zone), an object trespassing (e.g., crossing a line), an object moving in a wrong direction, a car taking an illegal "U" turn, a car parked in a handicapped and/or restricted zone, a restricted entry event (e.g., a restricted entry zone entry and/or exit), a two zone entry and/or exit, an exit and/or entry of an event (e.g., an object exit and/or entry event), a car entering a shoulder zone, a car needing assistance (e.g., in a shoulder zone), a person foraging, a person staying on target, a car crossing a line, a car restricted entry and/or exit event, a person target entry and/or exit event, and/or a shoulder entry event, among others. For each event detection rule, the user can input zone information such as coordinates trigger time and time duration. Once a portion of the track segment satisfies the event detection rule, an alarm can be sent at block 334.

As an example, the event detection rule can include the coordinates and direction of a trespass line. The track segments of a trajectory of an object that have intersected the trespass line coordinates can be detected and retrieved, and the track segments that have make the same angle as the direction line with respect to the trespass line can be detected and retrieved. When the event detection rule has been satisfied, an alarm can be sent.

As an additional example, the event detection rule can include the coordinates of a sterile zone. The track segments of a trajectory of an object that have intersected the sterile zone coordinates an be detected and retrieved, and the track segments that have an angle such that the track segment enters the sterile zone coordinates of the bounding box can be detected and retrieved. When the event detection rule has been satisfied, an alarm can be sent.

As an additional example, the event detection rule can include coordinates of a direction zone to detect an object moving in the wrong direction. The track segments of a trajectory of an object that have intersected the direction zone can be detected and retrieved, and the track segments that make an angle opposite to the direction specified by the direction zone can be detected and retrieved. When the event detection rule has been satisfied, an alarm can be sent.

In another example, whether an object trespasses a line can be determined by providing three points (e.g., two points of the line segment and an end point of the direction line) such that when a portion of the track segment crosses the line in the direction of the event detection rule, the alarm can be sent to the user.

In some embodiments, (e.g., event detection based on the type of event), the event parameters previously described herein can be used to retrieve the relevant track segments. The use of event parameters during track segment retrieval may remove non-relevant track segments, thereby reducing the processing time of the event detection.

As discussed herein, the track segments representing the trajectory of an object and the angle of the track segments are stored and indexed in a database at block 330. In an additional embodiment, a user can request for forensic analysis, at block 336, of the data stored in the database. The request can include an event detection rule, as discussed above. Since the track segments and the angles of the track segments were calculated and stored as the trajectory of the object was being made or immediately after the trajectory of the object is complete, users can define event detection rules at any time to determine when the event detection rules were satisfied (e.g., for forensic analysis). At block 338, the database can be queried for the event detection rules. At block 340, the user is provided with the compressed trajectory data of objects that satisfied the event diction rule.

Figure 4:
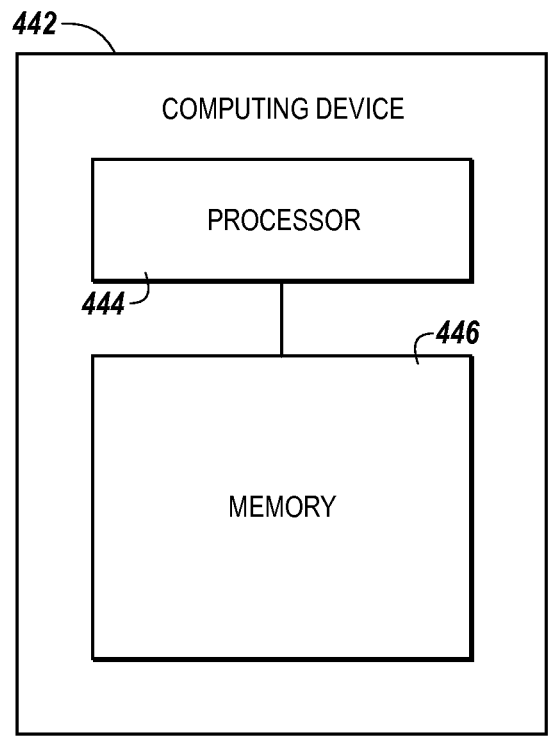
FIG. 4 illustrates a block diagram of a computing device for tracking an object in accordance with one or more embodiments of the present disclosure.

FIG. 4 illustrates a block diagram of a computing device 442 for identifying an object in accordance with one or more embodiments of the present disclosure. As shown in FIG. 4, computing device 442 includes a processor 444 and a memory 446 coupled to processor 444.

Memory 446 can be volatile or nonvolatile memory. Memory 446 can also be removable, e.g., portable memory, or non-removable, e.g., internal memory. For example, memory 346 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 446 is illustrated as being located in computing device 442, embodiments of the present disclosure are not so limited. For example, memory 446 can also be located internal to another computing resource, e.g., enabling computer readable instructions to be downloaded over the Internet or another wired or wireless connection.

Memory 446 can store executable instructions, such as, for example, computer readable instructions (e.g., software), for identifying an object in accordance with one or more embodiments of the present disclosure. That is, memory 446 can store executable instructions for performing one or more of the methods for identifying an object previously described herein, e.g., for performing one or more of the steps previously described herein.

Processor 444 can execute the executable instructions stored in memory 446 to identify an object in accordance with one or more embodiments of the present disclosure. That is, processor 444 can execute the executable instructions stored in memory 446 to perform one or more methods for identifying an object previously described herein, e.g., to perform one or more of the steps previously described herein.

Figure 5:
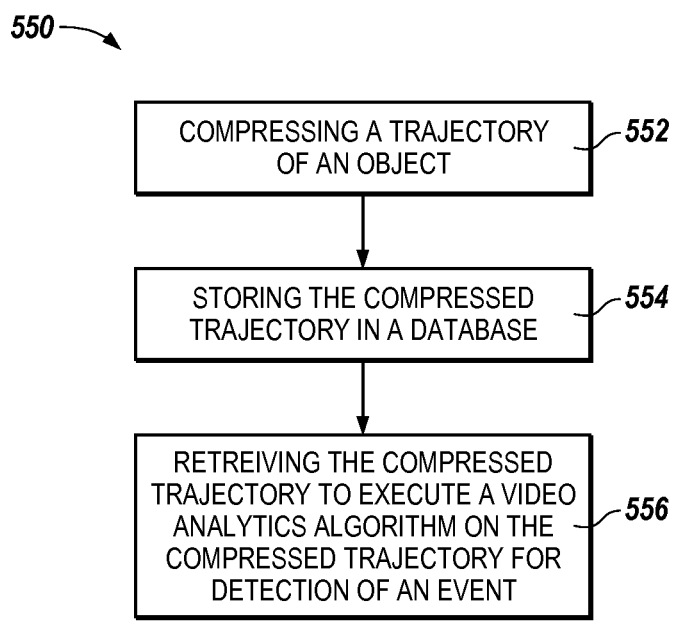
FIG. 5 is a flow chart illustrating a method for tracking an object in accordance with one or more embodiments of the present disclosure.

FIG. 5 is a flow chart 550 illustrating a method for tracking an object in accordance with one or more embodiments of the present disclosure. The method can be performed by a computing device (e.g., computing device 442 described in connection with FIG. 4). The object to be identified can be, for example, analogous to the object previously described in connection with FIG. 1.

At step 552, the trajectory of an object (e.g., the object to be identified) is compressed. The trajectory of the object can be compressed, for example, in a manner analogous to that previously described in connection with steps 104, 204, and/or 304 of FIGS. 1, 2, and 3, respectively.

At step 554, the compressed trajectory is stored in a database. The compressed trajectory can be, for example, analogous to the compressed trajectory data previously described in connection with step 330 of FIG. 3. At step 556, the compressed trajectory is retrieved to execute a video analytics algorithm on the compressed trajectory for detection of an event.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for tracking an object, comprising:
    compressing a plurality of initial data points associated with a trajectory of an object into a plurality of track segments, each track segment being a straight line having a start track point and an end track point, wherein compressing the plurality of initial data points into the plurality of track segments includes:
        determining a covariance matrix from a number of available track point spatial positions;
        determining eigen values for the covariance matrix;
        using a least one of the eigen values as a measure to determine a variation from a straight line trajectory; and
        comparing the least one of the eigen values with a spatial variation threshold to determine whether to stop or continue the compression;
    determining an angle of each track segment contained in the plurality of track segments with respect to a horizontal axis;
    storing the plurality of track segments and the angle of each track segment in a database; and
    determining whether an event detection rule has been satisfied by at least a portion of the plurality of track segments associated with the object.

2. The method of claim 1, wherein the method further includes:
    receiving metadata for the plurality of initial data points associated with the trajectory of the object.

3. The method of claim 2, wherein the metadata includes positions, boundary of a restricted zone, velocity, and direction at each data point in the trajectory of the object.

4. The method of claim 1, wherein determining the angle of each track segment includes using the starting point of each track segment as an origin of an axis for calculation of the angle along the track segment from the start point to the end point.

5. The method of claim 1, wherein the event detection rule includes restricted zone coordinates of a restricted zone.

6. The method of claim 5, wherein the method further includes:
   detecting and retrieving track segments of a trajectory of an object that have intersected the restricted zone coordinates of the bounding box; and
   detecting and retrieving track segments that have an angle such that the track segment enters the restricted zone coordinates of the bounding box.

7. The method of claim 5, wherein the method further includes:
   sending an alarm when the event detection rule has been satisfied.

8. A computing device for tracking an object, comprising:
   a memory; and
   a processor coupled to the memory, wherein the processor is configured to execute executable instructions stored in the memory to:
      compress a plurality of data points associated with a trajectory of an object into a plurality of track segments, each track segment being a straight line having a start track point and an end track point, wherein compressing the plurality of initial data points into the plurality of track segments includes:
         determining a covariance matrix from a number of available track point spatial positions;
         determining eigen values for the covariance matrix;
         using a least one of the eigen values as a measure to determine a variation from a straight line trajectory; and
         comparing the least one of the eigen values with a spatial variation threshold to determine whether to stop or continue the compression;
      index the plurality of track segments in a database; and
      detect an event based on an event rule.

9. The computing device of claim 8, wherein the processor is configured to execute the executable instructions to:
   index characteristics of the plurality of track segments for the trajectory of the object in the database, wherein the characteristics include positions of the track segment relative to a restricted zone boundary, time stamps of the track segment, velocity, and direction at track segment in the trajectory of the object.

10. the computing device of claim 8, wherein the processor is configured to execute the executable instructions to:
    determine the angle of each track segment of the trajectory of the object; and
    store and index the angle of each track segment in the database.

11. The computing device of claim 10, wherein the processor is configured to execute the executable instructions to:
    receive a request from a user to analyze the trajectory of an object; and
    query the database for the event rules based on the track segments and the angles of the track segments of the trajectory of the object.

12. The computing device of claim 10, wherein the processor is configured to execute the executable instructions to:
    assign the plurality of data points associated with the trajectory of the object a track identification number; and
    storing the plurality of track segments associated with the plurality of data points along with the track identification number.

* * * * *